United States Patent [19]

Hanabusa et al.

[11] Patent Number: 5,577,234
[45] Date of Patent: Nov. 19, 1996

[54] SYSTEM FOR CONTROLLING STORAGE DEVICE FOR STORING DATA AT SECOND DENSITY THAT IS NOT INTEGRAL MULTIPLE OF FIRST DENSITY BY VARYING THE DEVICE MOTOR SPEED

[75] Inventors: Hiroshi Hanabusa, Sagamihara; Yasuhiro Kotani, Yamato; Nobuaki Satoh, Machida; Osamu Yamamoto, Sagamihara, all of Japan

[73] Assignee: International Business Machines Corporation, Armonk, N.Y.

[21] Appl. No.: 567,865

[22] Filed: Dec. 6, 1995

Related U.S. Application Data

[63] Continuation of Ser. No. 947,001, Sep. 17, 1992, abandoned.

[30] Foreign Application Priority Data

Sep. 26, 1991 [JP] Japan ..................... 3-273460

[51] Int. Cl.$^6$ ................. G06F 15/40
[52] U.S. Cl. ............. 395/500; 395/438; 395/834; 360/902; 364/221.6; 364/236.2; 364/254.8; 364/DIG. 1
[58] Field of Search ................ 395/438, 834, 395/500; 360/75, 69, 902

[56] References Cited

U.S. PATENT DOCUMENTS

| | | | |
|---|---|---|---|
| 4,514,771 | 4/1985 | Stark et al. | 360/73 |
| 4,604,663 | 8/1986 | Moribe et al. | 360/73 |
| 4,633,340 | 12/1986 | Hayakawa | 360/49 |
| 4,641,207 | 2/1987 | Green et al. | 360/55 |
| 4,644,418 | 2/1987 | Banno et al. | 360/39 |
| 4,656,533 | 4/1987 | Sakai et al. | 360/65 |
| 4,724,493 | 2/1988 | Nakamura | 360/51 |
| 4,742,448 | 5/1988 | Sander et al. | 395/438 |
| 4,773,036 | 9/1988 | Berens et al. | 360/48 |
| 4,807,063 | 2/1989 | Moteki | 360/98.01 |
| 4,816,942 | 3/1989 | Tanishima et al. | 360/75 |
| 4,825,321 | 4/1989 | Hassel et al. | 360/51 |
| 4,872,107 | 10/1989 | Marple et al. | 395/700 |
| 4,924,330 | 5/1990 | Seamons et al. | 360/66 |
| 5,031,168 | 7/1991 | Moore | 360/40 |
| 5,073,832 | 12/1991 | Ohashi et al. | 360/75 |
| 5,099,368 | 3/1992 | Okamura | 360/61 |
| 5,109,500 | 4/1992 | Iseki et al. | 395/894 |
| 5,150,465 | 9/1992 | Bush et al. | 395/834 |
| 5,257,367 | 10/1993 | Goodlander et al. | 395/600 |
| 5,293,625 | 3/1994 | Miura et al. | 395/500 |
| 5,434,722 | 7/1995 | Bizjak et al. | 360/69 |

*Primary Examiner*—Thomas C. Lee
*Assistant Examiner*—Moustafa Mohamed Meky
*Attorney, Agent, or Firm*—Martin J. McKinley; Andrew J. Dillon

[57] ABSTRACT

According to the present invention, a function can be added to a peripheral apparatus by making a change in only a few parts of a data processing system without making changes regarding hardware in, especially, a system unit nor an interface part between the system unit and the peripheral apparatus. A predetermined control signal, said signal being a signal for causing a peripheral apparatus such as a floppy disk drive to perform a first predetermined operation, is provided to said peripheral apparatus in a predetermined condition in order to cause said peripheral apparatus to perform a second predetermined operation which is different from said first predetermined condition.

7 Claims, 5 Drawing Sheets

SYSTEM FOR CONTROLLING STORAGE DEVICE FOR STORING DATA AT SECOND DENSITY THAT IS NOT INTEGRAL MULTIPLE OF FIRST DENSITY BY VARYING THE DEVICE MOTOR SPEED

This is a continuation of application Ser. No. 07/947,001, filed 17 Sep. 1992, now abandoned.

FIELD OF THE INVENTION

This invention relates to a data processing system comprising a system unit, cable and a peripheral apparatus connected thereto. More particularly, the peripheral apparatus, such as a floppy disk drive, offers an additional function in which cable pin-outs need not be changed.

BACKGROUND OF THE INVENTION

For 3.5" floppy disks (FD), 1.2 MB (after formatting) capacity is widely used in Japan, while 720 KB/1.44 MB (after formatting) capacity is widely used in major countries other than Japan. Data processing systems that can read/write not only 720 KB/1.44 MB FD are known, as well as systems that can read/write 1.2 MB FD. However, the prior art requires a hardware block (such as an I/O register which can be accessed by a main central processing unit (CPU) of the system unit) to be added to the system unit which can read/write 720 KB/1.44 MB FD in order to also read/write 1.2 MB FD. Furthermore, in the prior art, a cable for connecting the system unit and the floppy disk drive apparatus requires a signal line to be added for dedicating a control signal from the system unit to the floppy disk drive apparatus for causing the floppy disk drive apparatus to read/write 1.2 MB FD. Thus, a data processing system suited to 720 KB/1.44 MB capacity formatting that is modifiable into a data processing system suited to three types of capacity formatting of 720 KB/1.2 MB/1.44 MB by making only a few changes is desired.

The following are descriptions of two data processing systems, a first suited to two types of capacity formatting of 720 KB/1.44 MB, and then of a second data processing system suited to three types of capacity formatting of 720 KB/1.2 MB/1.44 MB by changing said data processing system suited to two types of capacity formatting of 720 KB/1.44 MB.

Turning first to FIG. 4, an example of a conventional data processing system which may read/write only 720 KB FD and 1.44 MB FD is shown. A system unit 1 includes a main CPU 3, a main memory 5 for storing a program including a device driver program (BIOS) 6, a floppy disk controller (FDC) 7, a group of I/O registers 9, a part or all of which are provided within the FDC 7, and a connector 11. The connector 11 has, for example, 34 pins and is connected to a floppy disk drive apparatus 31 through a two-mode floppy disk drive (FDD) cable 21, which is also called a standard FDD cable. The cable 21 is provided with multiple cable connectors (#0 and #1) so that multiple floppy disk drive apparatus 31 may be attached to the system unit 1.

The I/O registers 9 are mapped in an I/O address space of the main CPU 3. The I/O addresses are, for example, 03F1hex, 03F2hex, and so on. The program in the memory 5 contains a FDD device driver or a BIOS 6 for controlling the floppy disk drive apparatus 31 from the system unit 1 in a manner well known. The CPU 3 reads/writes bit patterns from/into the I/O registers 9 in order to communicate with the FDC 7. When the CPU 3 writes bit patterns into the I/O registers 9, the FDC 7 sends signals to a pin or pins of the connector, according to the bit patterns written by the CPU 3. When the FDC 7 writes bit patterns into the I/O registers 9 according to the signals from the floppy disk drive apparatus 31, the CPU 3 reads the bit patterns written by the FDC 7.

The floppy disk drive apparatus 31 has a connector 33, a standard logic circuit 35, a read/write circuit 36, a head 37, a stepping motor 38 for moving the head 37, a stepping motor driver 39 for driving the stepping motor 38, a spindle motor 42 for rotating a floppy disk, and a spindle motor driver 43 for driving the spindle motor 42. The rotation speed of the spindle motor 42 is adjusted to 300 revolutions per minute (rpm) in both of 720 KB mode and 1.44 MB mode. Only the speed of the data transmission between the system unit 1 and the apparatus 31 is different between 720 KB mode and 1.44 MB mode. The connector 33 is connected to the cable connector #0 or #1.

The standard cable 21 includes a pin 2 and a pin 4. In Table 1, the pin 2 is dedicated for the selection of the data transmission rate, and the pin 4 is connected to a floppy disk drive apparatus identification line. The floppy disk drive apparatus 31 operates in 1.44 MB mode (the data rate is 500 Kbps.) if a data rate selection signal on the pin 2 is in a true level, while the apparatus 31 operates in 720 KB mode (the data rate is 250 Kbps.) if the data rate selection signal on the pin 2 is in a false level. The drive identification line is dedicated for informing the system unit 1 that the apparatus 31 is active when a drive selection signal (the pin 4) is in true level.

TABLE 1

| Pin 2 | Data Transition Rate Selection 1 |
| --- | --- |
| Pin 4 | Drive Identification |

Turning now to FIG. 5, another conventional data processing system which operates in three modes, which are 720 KB mode, 1.2 MB mode, and 1.44 MB mode is shown. In order to operate in the 1.2 MB mode (in addition to the 720 KB mode and 1.44 MB mode), the spindle motor 42 operates at 360 rpm as well as at 300 rpm. An additional I/O register 20 is required for a system unit 101 in addition to the existing group of I/O registers 9. The I/O address of the additional I/O register 20 is one of reserved addresses, for example, 097Fhex.

FIG. 6 shows a bit definition of the additional I/O register 20. The bit 0 defines the rotation speed of the spindle motor 42 of a floppy disk drive apparatus 131 connected to the connector #1 of a three mode cable 26. The bit 3 defines the rotation speed of the spindle motor 42 of the floppy disk drive apparatus 131 connected to the connector #0. The spindle motor 42 of the FDD apparatus 131 connected to the connector #1 operates at 300 rpm for 1.44 MB/720 KB modes if the bit 0 presents 0, while the spindle motor 42 operates at 360 rpm for 1.2 MB mode if the bit 0 presents 1. The spindle motor 42 of the FDD apparatus 131 connected to the connector #0 operates at 300 rpm for the 1.44 MB/720 KB modes if the bit 3 presents 0, while the spindle motor 42 works at 360 rpm for the 1.2 MB mode if the bit 3 presents 1. A device driver program is required for the CPU 3 to read/write data from or to the register 20.

The conventional system as shown in FIG. 5 requires the cable 26 which is dedicated for supporting the three mode operation. The standard cable 21 as shown in FIG. 4 cannot be used instead of the three mode cable 26. In the three mode FDD cable 26, as shown in Table 2, the pin 2 defines the rotation speed of the spindle motor 42 of the FDD 131 connected to the connector #0, while the pin 4 defines the rotation speed of the spindle motor 42 of the FDD 131 connected to the connector #1. In FIG. 5, the pin 2 is electrically connected only to the connector #0 without being connected to the connector #1. The pin 4 is not connected to the connector #1 but connected to the connector #0. The connection point of pin 4 to the connector #0 corresponds to the connection point of pin 2 to the connector #1.

TABLE 2

| Pin 2 | Motor Speed Selection for Connector #0 |
| Pin 4 | Motor Speed Selection for Connector #1 |

In FIG. 5, the system has a detection means 45 and a speed changing means 46. The detection means 45 is for detecting the signal defining the spindle motor speed. The speed changing means 46 is for changing the rotation speed of the spindle motor 42 by changing the voltage applied to the motor 42. The motor works at either 300 rpm or 360 rpm in response to the signal from pin 2.

As mentioned above, in order to operate in the three modes, the conventional data processing system requires additional hardware structures as hardware modifications in system unit 101, the floppy disk drive apparatus 131, and the cable 26. The hardware modifications cause a great increase in reliability tests, which induce cost increases and lengthen development periods. Thus, there is a need for a data processing system operable in three modes by making only a few changes, which do not include the hardware changes in the system unit or the cable between the system unit and the FDD apparatus.

Further, there is a need for not only a data processing system operable in three modes by making only a few changes in the system operable in two modes, but also that a new function may be added to a floppy disk drive apparatus by making a change to only a few features of the existing data processing system.

Still further, for any peripheral apparatus other than a floppy disk drive apparatus, there is a need that a new function may be added to the peripheral apparatus by making a change to only a few features of a data processing system without making changes to hardware, especially, a system unit and an interface between the system unit and the peripheral apparatus.

OBJECTS OF THE INVENTION

It is therefore an object of the present invention to offer additional function to a peripheral apparatus without making hardware changes in a system unit or an interface between the system unit and the peripheral apparatus.

Another object of the present invention is to offer additional function to a peripheral apparatus, such as a floppy disk drive apparatus, without making hardware changes in a system body or a cable which connects the system body and the floppy disk drive apparatus.

SUMMARY OF THE INVENTION

According to the present invention, in a data processing system which includes a system unit having a CPU and main memory for storing a program being run by said CPU and data associated with said program, and a peripheral apparatus attached to said system unit, detection means for detecting the receipt of a predetermined control signal from the system unit in a predetermined condition is provided. The predetermined control signal initially causes the peripheral apparatus to perform a first predetermined operation and subsequently offers a means for performing a second operation, which is different from the first predetermined operation, and in response to the detection means.

Further, a peripheral apparatus such as a floppy disk drive apparatus according to the present invention is provided with detection means for detecting the receipt of a predetermined control signal. The predetermined control signal originally being a signal for causing said apparatus to perform a first predetermined operation, and means for performing a second predetermined operation which is different from said first predetermined operation in response to said detection means.

Further, a method for controlling a peripheral apparatus, such as a floppy disk drive apparatus, according to the present invention is, by providing a predetermined control signal, in a predetermined condition. The predetermined control signal being originally a signal for causing the peripheral apparatus to perform a first predetermined operation, and changing the control signal in order to cause the peripheral apparatus to perform a second predetermined operation which is different from the first predetermined operation.

DETAILED DESCRIPTION OF THE INVENTION

Figure 2:
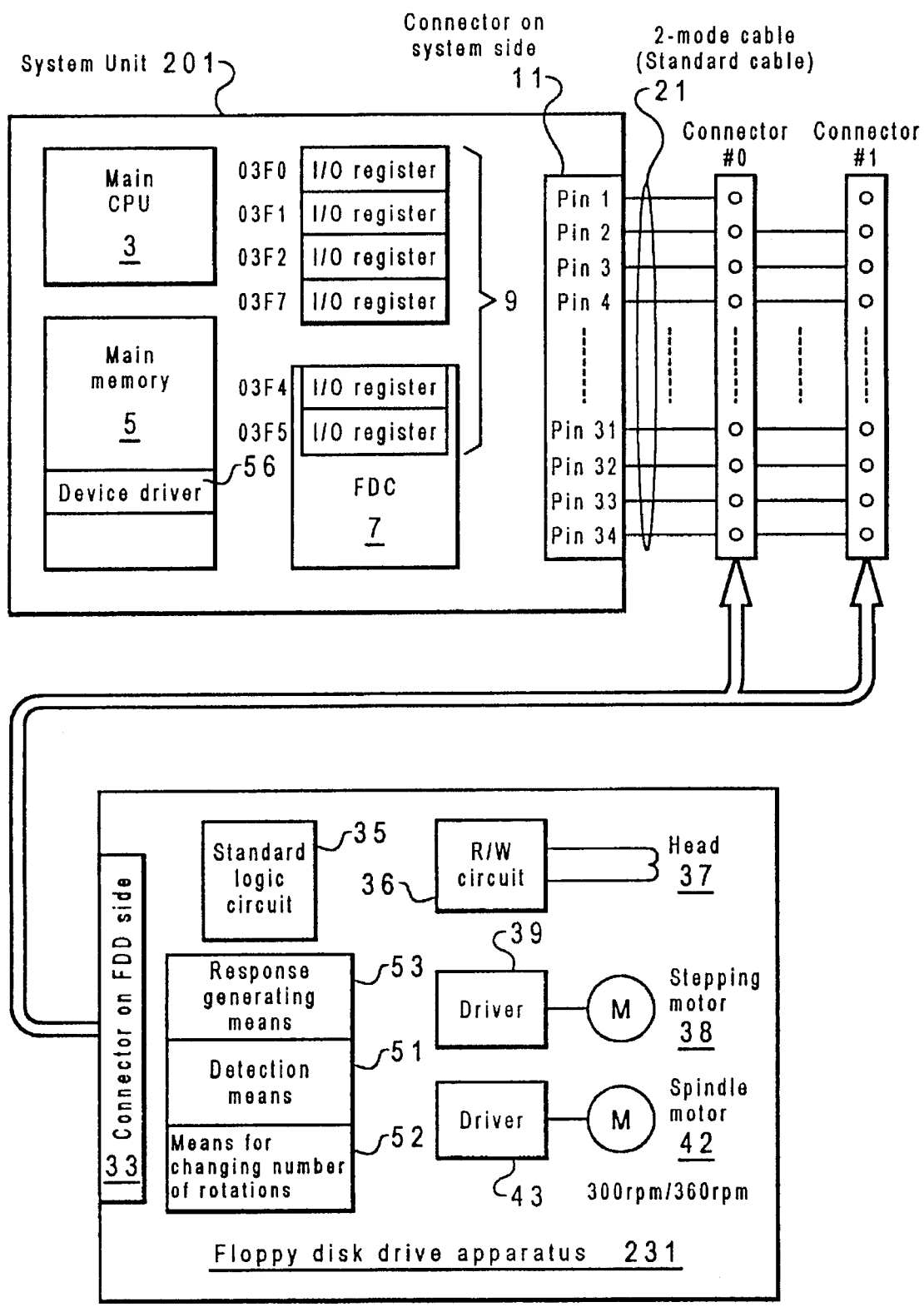
FIG. 2 is a block diagram showing the more detailed construction of said embodiment.

In the following, the present invention is described with reference to the drawings. However, the description of parts which are the same or similar to conventional apparatuses is omitted or simplified using the same symbol as in the drawings. FIG. 2 shows an embodiment of a data processing system according to the present invention. In the figure, no changes regarding hardware are made to a system unit 201, which makes no difference in terms of hardware from the conventional system unit 1 of FIG. 4. The cable is the same as the standard cable 21 of FIG. 4. As shown in Table 3, pin 20 is dedicated for a control signal called a step signal (-STEP). A step signal, a pulse which is active for a microsecond, causes a head 37 to move only one track for one pulse. The direction of the head movement depends on the states of a direction signal (-DIRECTION) on the pin 18.

TABLE 3

| | |
|---|---|
| Pin 20 | 1 Step Signal |
| Pin 26 | Track 0 Signal |

The time interval between the two adjacent step signals may be changed using a command which the CPU 3 issues to the FDC 7. Each command from the CPU 3 to the FDC 7 is initiated by a multiple byte transfer, and its result is returned to the CPU 3 by the multiple byte transfer. Such a transfer of information on a command between the CPU 3 and the FDC 7 is performed using an I/O register within the FDC 7. The I/O register is also called a data register, and the I/O address is 03F5hex in FIG. 2. The command for defining the time interval of the step signals is called a specify command (SPECIFY). The specify command includes a 4 bit portion which is called a step rate time (SRT). The sixteen combinations of the 4 bits of the SRT defines the time interval between the two adjacent step signals. This time interval is selected from sixteen values based on the SRT in the specify command. The time interval of the step signals is already changeable in the art by defining the value of the SRT. The capability of response speed of the head 37 against the step signal varies depending on the type and performance of a floppy disk drive apparatus 231. Therefore, in order to cope with the different capability of the head speed, the time interval is already changeable in the art.

Figure 1:
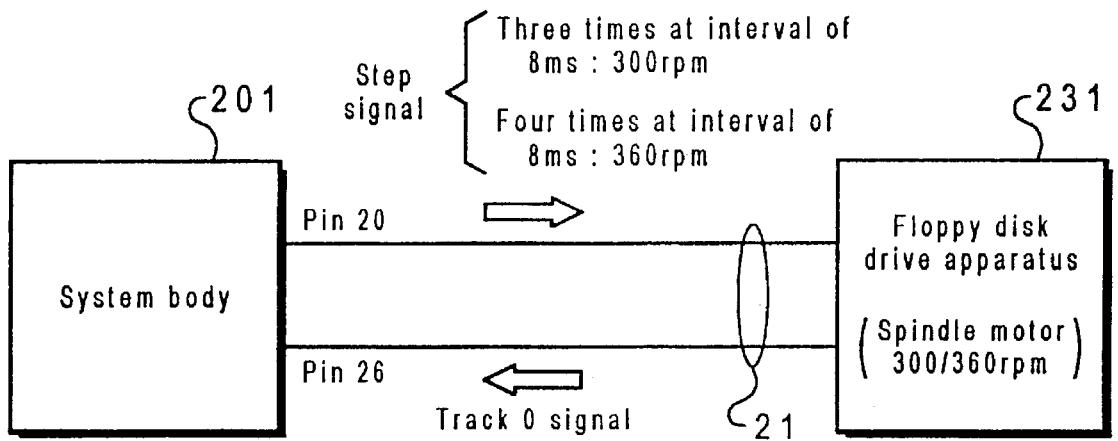
FIG. 1 is a block diagram showing the overall construction of an embodiment of a data processing system according to the present invention.
Figure 6:
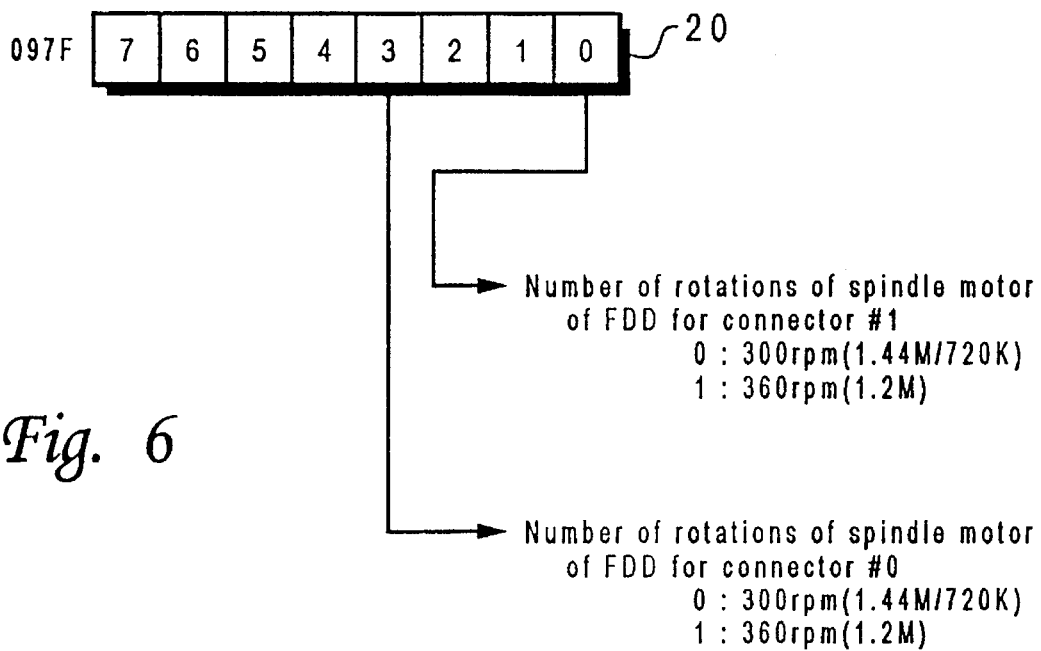
FIG. 6 is a block diagram showing the construction of an additional register of a conventional data processing system suited to three modes of operation.

In the preferred embodiment, a predetermined control signal (or step signal) is used not only for moving the head 37 by one track (or performing another first predetermined operation) but also for altering the rotation speed of the spindle motor 42 (or initiating another second predetermined operation) upon the occurrence of the predetermined control signal in a predetermined condition. Accordingly, the predetermined condition may be defined as the step signal occurring a predetermined number of times at a predetermined time interval, with the predetermined condition initiating the second predetermined operation. As shown in FIG. 1, the spindle motor 42 operates at 300 rpm for the 720 KB/1.44 MB modes in response to the receipt of three step signals at time intervals of 8 ms; while the spindle motor 42 operates at 360 rpm for the 1.2 MB mode in response to the receipt of four step signals at time intervals of 8 ms. Consecutive step signals with time intervals other than 8 ms (such as any of 3 ms, 4 ms, or 6 ms) causes the seek operation of the head 37. A device driver program 56 works to issue the above commands.

In FIG. 2, a detection means 51 in the apparatus 231 detects whether the step signal is provided to the floppy disk drive apparatus 231 in such a way as described above. In response to the detection means 51, a means for changing the number of rotations 52 changes the rotation speed of the motor 42. A response generating means 53 sends a track 0 signal to the system unit 201, in response to the receipt of the step signals in the above mentioned condition. The track 0 signal is originally a status signal which is sent from the floppy disk drive apparatus 231 to the system unit 201 when the head 37 is positioned in the track 0 of the floppy disk. In the preferred embodiment, however, the track 0 signal is also used as a predetermined status signal to indicate a predetermined status, and to acknowledge to the system unit 201 that the floppy disk drive apparatus 231 received a command for changing the motor speed and is in the predetermined status. The track 0 signal is sent through pin 26 connected to the standard cable 21 to the system unit 201.

Figure 3:
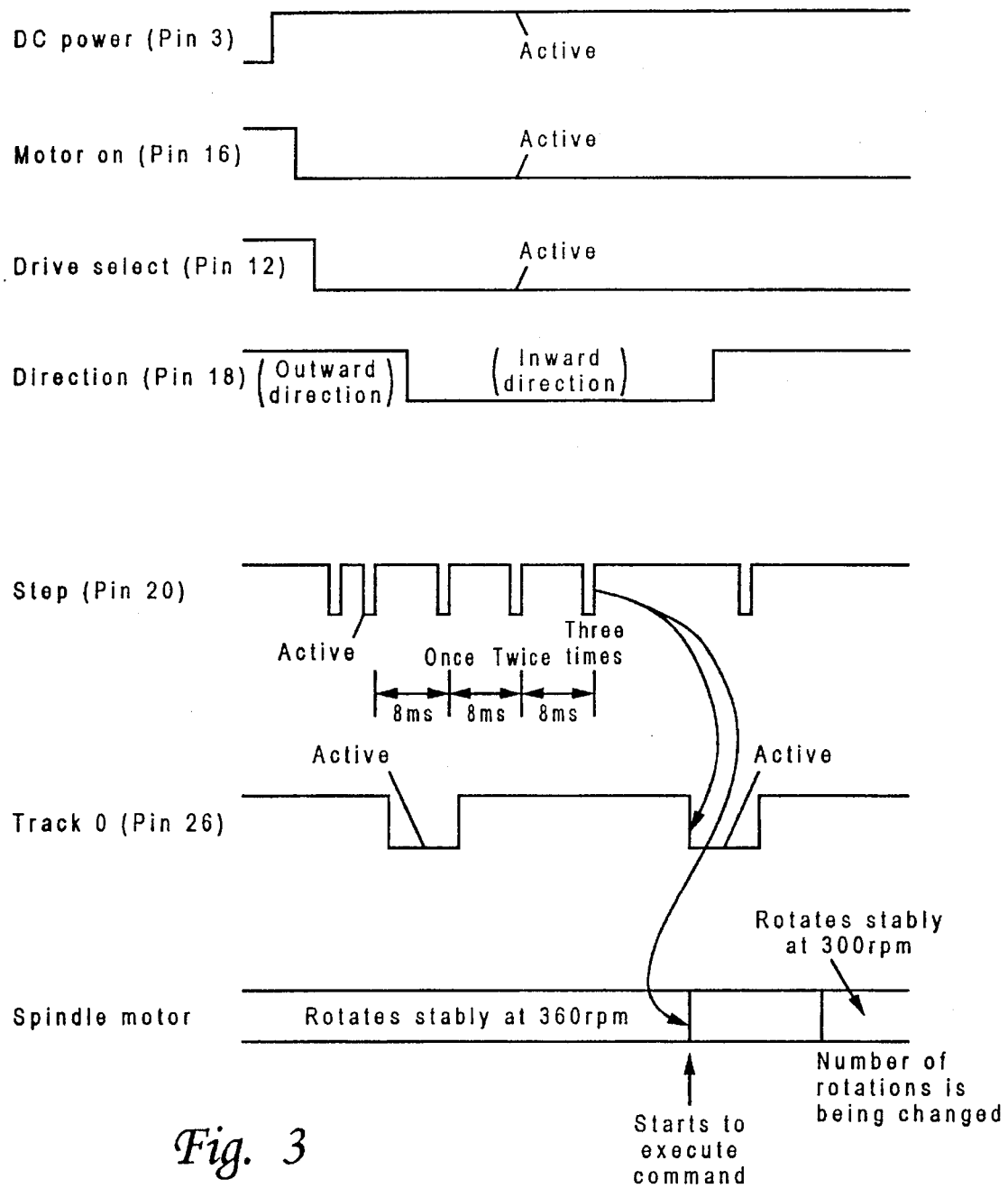
FIG. 3 is a waveform diagram showing various signals of said embodiment.

FIG. 3 shows the wave forms of the step signal, the track 0 signal and the like when the motor speed is to be changed from 360 rpm to 300 rpm. Under the condition that the DC power upon the pin 3 of the standard cable 21, a motor on signal upon the pin 16, and a drive selection signal upon the pin 12 are all active and the direction signal upon the pin 18 indicates the inner direction of the head movement and the head 37 is positioned at the track 0 of the floppy disk, the motor speed is changed from 360 rpm to 300 rpm in response to the receipt of three step signals at 8 ms time intervals.

Figure 4:
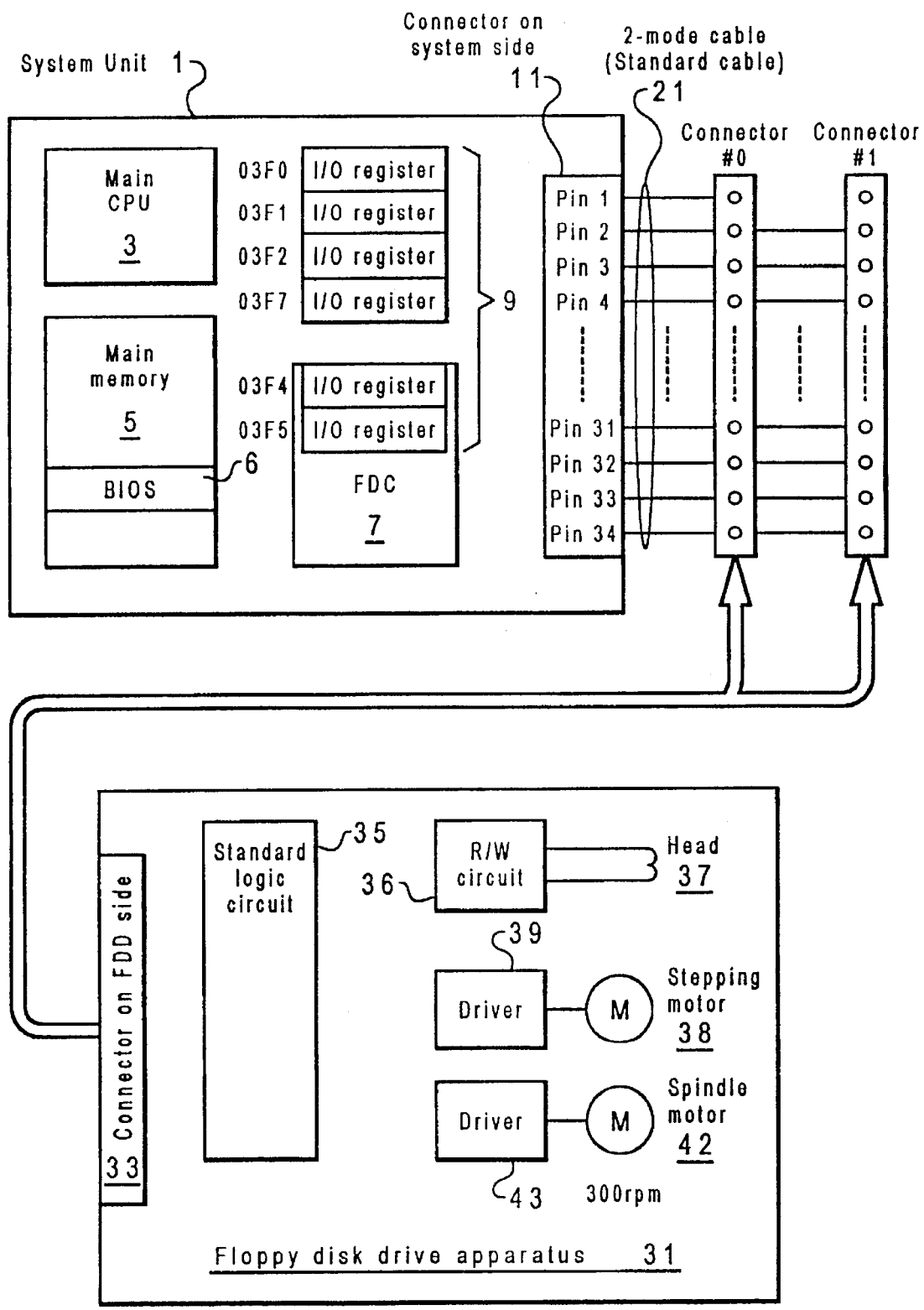
FIG. 4 is a block diagram showing the construction of a conventional data processing system suited to two modes of operation.
Figure 5:
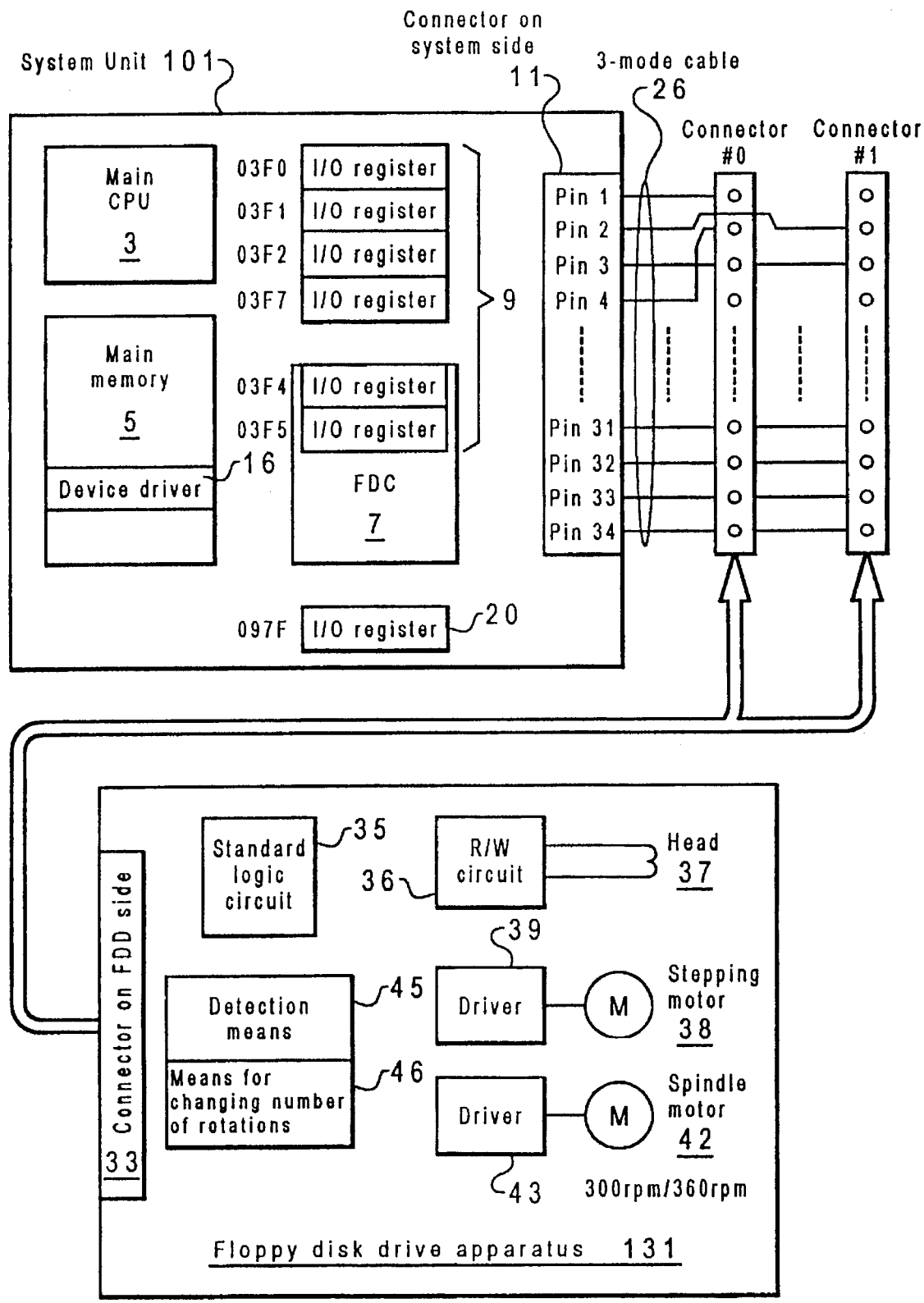
FIG. 5 is a block diagram showing the construction of a conventional data processing system suited to three modes of operation.

According to the above embodiment, the data processing system operates at the three modes without the requirement of hardware changes in the system unit 201 nor in the standard cable 21 of FIG. 4.

While in the above embodiment, the predetermined condition is the predetermined times of the step signal and the predetermined time intervals between the consecutive step signals, but the predetermined condition may be another condition as far as it is detectable by the floppy disk drive apparatus. Moreover, any signal other than the step signal may be used for changing the capacity mode. It will be appreciated that the present invention may be applied not only to adding a function of a capacity mode, but also to adding other functions and to adding a function to any peripheral apparatus such as a storage device, printer, display unit, and communication device other than a floppy disk drive apparatus.

While the invention has been described above in connection with a preferred embodiment therefore as illustrated by the drawings, those of skill in the art will readily recognize alternative embodiments of the invention can be easily produced which do not depart from the spirit and scope of the invention as defined in the following claims.

We claim:

1. A method for controlling a peripheral storage device of a data processing system, wherein said peripheral storage device includes a motor and is designed to store data at a first density and integral multiples thereof in response to receiving a plurality of control signals while said motor operates at a predetermined rotation speed, said method comprising:

transmitting a particular control signal among said plurality of control signals from said data processing system to said peripheral storage device to initiate an operation other than storing data;

in response to receiving said particular control signal, transmitting a status signal to said data processing system to indicate that said peripheral storage device is performing said operation other than storing data;

varying said particular control signal; and in response to varying said particular control signal, varying said rotation speed of said motor and storing data within said peripheral storage device at a second density that is not an integral multiple of said first density.

2. The method for controlling a peripheral storage device of claim 1, wherein said step of varying said particular control signal comprises:

transmitting said particular control signal a predetermined number of times at a preset time interval.

3. The method for controlling a peripheral storage device of claim 1, wherein said peripheral storage device is a disk drive, and wherein said particular control signal comprises a signal utilized to control movement of a magnetic transducer across a surface of a magnetic media within said disk drive.

4. An apparatus for controlling a peripheral storage device of a data processing system, wherein said peripheral storage device includes a motor and is designed to store data at a first density and integral multiples thereof in response to receiving a plurality of control signals while said motor operates at a predetermined rotation speed, said system comprising:

means for transmitting a particular control signal among said plurality of control signals from said data processing system to said peripheral storage device to initiate an operation other than storing data;

means for transmitting a status signal to said data processing system to indicate that said peripheral storage device is performing said operation other than storing data in response to receiving said particular control signal;

means for varying said particular control signal; and means for varying said rotation speed of said motor and storing data within said peripheral storage device at a second density that is not an integral multiple of said first density in response to varying said particular control signal.

5. The apparatus for controlling a peripheral storage device of claim 4, wherein said means for varying said particular control signal comprises:

means for transmitting said particular control signal a predetermined number of times at a preset time interval.

6. The apparatus for controlling a peripheral storage device of claim 5, wherein said peripheral storage device is a disk drive, and wherein said particular control signal comprises a signal utilized to control movement of a magnetic transducer across a surface of a magnetic media within said disk drive.

7. The apparatus for controlling a peripheral storage device of claim 4, wherein said peripheral storage device comprises a floppy disk drive.

* * * * *

UNITED STATES PATENT AND TRADEMARK OFFICE
CERTIFICATE OF CORRECTION

PATENT NO. : 5,577,234
DATED : November 19, 1996
INVENTOR(S) : Hanabusa Et Al.

It is certified that error appears in the above-indentified patent and that said Letters Patent is hereby corrected as shown below:

Column 2, Table 1: delete "1" after "Selection"

Column 5, Table 3: delete "1" before "Step"

Signed and Sealed this

Twenty-fifth Day of February, 1997

Attest:

BRUCE LEHMAN

*Attesting Officer*      *Commissioner of Patents and Trademarks*